Jan. 26, 1943.　　　　G. I. HOLMES　　　　2,309,193
THERMOSTAT
Filed Oct. 30, 1939

Inventor
Gifford I. Holmes
By George H. Fisher
Attorney

Patented Jan. 26, 1943

2,309,193

UNITED STATES PATENT OFFICE 2,309,193

THERMOSTAT

Gifford I. Holmes, Minneapolis, Minn., assignor to Minneapolis-Honeywell Regulator Company, Minneapolis, Minn., a corporation of Delaware Application October 30, 1939, Serial No. 301,900

21 Claims. (Cl. 200—139)

My invention relates to heat responsive actuating devices, particularly to new forms of thermostats and improvements in thermostatic devices.

An object of my invention is to provide an improved unitary thermostat for controlling temperatures in a plurality of ranges, commonly referred to as a day-night thermostat.

Another object is to provide an improved day-night thermostat in the form of a unitary instrument utilizing a single temperature responsive element and having improved individual adjustments for the day and night settings.

Another object is to provide an improved plural stage thermostat wherein contacts are sequentially operated upon a change in temperature.

Another object is to provide an improved thermostatic device for operating electrical contacts or the like at different temperatures wherein the thermostatic element bodily rotates itself about a pivot first in one direction and then in the other.

Another object is to provide a thermostat employing a warpable element wherein the entire length of the element is effective to actuate a plurality of contacts in sequence.

Another object is to provide a plural stage thermostat wherein a bimetal element rotates itself about a pivot and cooperates with a magnetic device also effective to rotate the element about a pivot.

Another object is to provide a generally U shaped bimetal element so arranged that the entire length of bimetal is effective to actuate a plurality of pairs of contacts.

Another object is to provide a warpable element having a plurality of portions cooperating with magnets, the element being arranged to break different portions away from the magnets at different temperatures.

Another object is to provide a pivoted warpable element wherein the element is releasably restrained at points on opposite sides of the pivot, the element developing an internal tension upon temperature change tending to free it from the restraining means.

For a better understanding of the invention, reference may be had to the following detailed specification and the annexed drawing, wherein.

Figure 1:
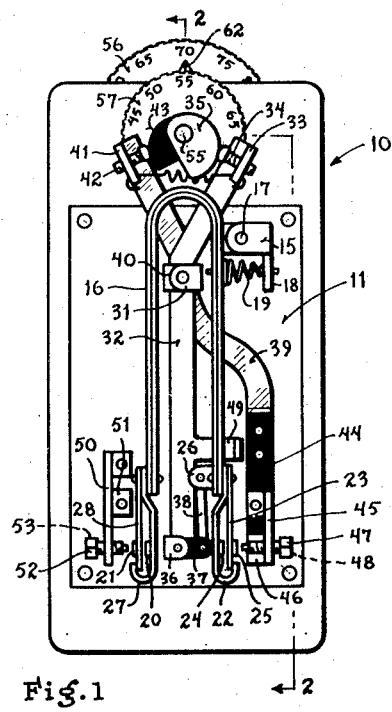
Figure 1 is a front view of a day-night thermostat constituting one form of my invention.

Referring to Figure 1 of the drawing, numeral 10 designates generally a day-night thermostat having a base panel 11 which is preferably made of a suitable composition. The base panel 11 is secured by riveting or the like to a metal plate 12, there being an opening in the plate 12 which is covered by the base panel 11. Bordering the opening in the plate 12 is a flange 13 forming a recess or shoulder into which the base panel 11 interfits.

Figure 2:
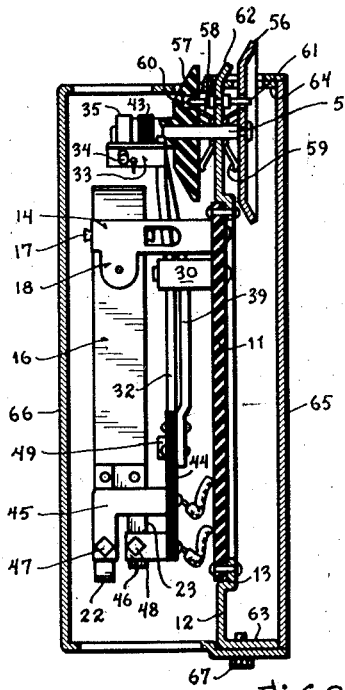
Figure 2 is a cross-sectional side view of Figure 1 taken along the line 2—2.

Secured to the base panel 11 is a bracket 14 having a pair of ears one of which may be seen on Figure 1 and is indicated by the numeral 15. The other ear is similar to the ear 15 and is formed by material cut out of the bracket 14 having the shape of the opening in the bracket 14 as seen in Figure 2, and bent outwardly so as to be parallel to the bracket 15. Numeral 16 designates a generally U shaped bimetallic element, the element having a pair of ears corresponding to the ear 15, these ears being juxtaposed to the ears on the bracket 14. A pivot 17 extends through all of the ears whereby the element 16 may be rotated about the pivot. The bracket 14 has a downwardly extending tab 18 and between this tab and one leg of the element 16 is interposed a coiled compression spring 19 which urges the element 16 in a clockwise direction around the pivot 17.

As seen on Figure 1, the U shaped element 16 is in an inverted position and at the lower end of the right leg of the U are attached by riveting or the like contact brackets 22 and 23, the bracket 22 carrying a contact 24 and bracket 23 carrying a contact 25. The portion of the bracket 23 which is secured to the element 16 overlies the bracket 22 and it has an ear 26 bent at right angles, this ear being visible on Figure 1 and the purpose of which will be hereinafter described. At the lower end of the left leg of the element 16 are attached contact brackets 27 and 28 which correspond to the brackets 22 and 23, being attached to the element 16 in the same manner. Brackets 27 and 28 carry contacts 20 and 21, respectively.

Numeral 30 designates another bracket suitably attached to the base panel 11 and having an ear 31 bent at right angles thereto, to which is pivoted a lever arm 32. The lever arm 32 is angular as seen on Figure 1 in the manner of a bell-crank lever, its upper end having an angular portion 33 carrying a screw 34 which forms a cam follower for a cam 35. The cam 35 will be referred to again presently. At the lower end of the lever 32 is a bracket 36 to which is pivotally attached a link 37 made of insulating material, and pivotally connected between the link 37 and the previously described ear 26 is another link 38. The link 37 bears against the contact bracket 22 and, as can be seen, as the lever 32 is rotated on its pivot the element 16 can be adjusted about its pivot by reason of the link 37 bearing against the bracket 22. By freely pivoting the links 37 and 38, a relatively friction free engagement between the link 37 and the contact bracket 22 is obtained when the bimetal 16 expands and contracts due to temperature changes.

Numeral 39 indicates another lever similar to the lever 32 but having a somewhat different shape, the lever 39 having a bracket 40 which is pivoted to the bracket 30 in the same manner as the lever 32 is pivoted. The upper end of the lever 39 has an angular portion 41 carrying a screw 42 similar to the screw 34 and forming a cam follower for a cam 43 which will be referred to again presently. Suitably attached to the lower end of the lever 39 is an insulating strip of material 44. Attached to the strip 44 are contact brackets 45 and 46, the contact bracket 45 carrying a contact screw 47 and the contact bracket 46 carrying a contact screw 48. The contact screws 47 and 48 have contacts at their ends which cooperate with contacts 24 and 25, respectively.

Fastened to the base panel 11 by riveting, or the like, adjacent to the lower end of the left leg of the element 16 are contact brackets 50 and 51 which correspond to the contact brackets 45 and 46. The contact brackets 50 and 51 carry contact screws 52 and 53, respectively, the contact screw 53 not being visible on Figure 1. The contact screws 52 and 53 have contacts cooperating with the contacts 20 and 21 on the contact brackets 27 and 28, respectively.

The cam 35 is mounted on the end of a shaft 55 which extends through the upper part of the plate 12 and which at its opposite end carries an indicating or setting dial 56 which is suitably attached thereto. The dial 56 is graduated in degrees of temperature as seen on Figure 1 and is manually adjustable. The cam 43 is formed integrally with a fiber disc 57, the disc 57 and cam 43 being rotatably engaged on the shaft 55. The disc 57 forms a dial graduated in degrees of temperature as seen on Figure 1 and is manually adjustable similar to the dial 56. Interposed between the dial 57 and the upper portion of plate 12 is a spider 58 having resilient arms which frictionally engage the dial 57 and urge it away from the plate 12, the shaft 55 extending through the spider. Numeral 59 designates a spider similar to the spider 58 on the opposite side of the plate 12, having arms frictionally engaging the dial 56 and urging it away from the plate 12. The resiliency of the spiders acting on the dials serves to retain the shaft and cam assembly in alignment and by reason of the frictional engagement between the spiders and the dials, the dials remain in any position to which they are manually adjusted. Numeral 60 indicates a projection forming a stop which extends to the left from plate 12 into an arcuate groove or slot in the dial 57 whereby rotation of the dial 57 is limited by the extent of the arcuate groove or slot. Numeral 61 indicates a similar projection forming a stop extending to the right from plate 12 through an arcuate opening in the dial 56, rotation of the dial 56 being limited by the extent of the arcuate opening therein. Numeral 62 indicates an indicator formed integrally with plate 12 for setting the adjusting dials.

From the foregoing, it is to be seen that by adjusting the dial 56, the cam 35 is rotated and moves the cam follower 34 thus serving to adjust the lower end of lever 32 whereby the element 16 is adjusted about its pivot 17. When the dial 57 is adjusted, the shaded cam 43 adjusts the lever 39 whereby the contact screws 47 and 48 are adjusted in position with respect to the contact brackets 22 and 23. The adjustments will be referred to more in detail later.

The plate 12 has horizontal portions 63 and 64 to which may be suitably secured a back plate 65. Numeral 66 indicates a cover or casing for the instrument which fits over the mechanism which has been described and as shown has openings through which portions of the dials 56 and 57 extend exteriorly of the instrument. The indicator 62 also extends through an opening in the cover 66, and the cover also has openings in its top and bottom sides as shown to permit circulation of air through the instrument and in contact with the element 16. The cover 66 may be secured in position by means of a screw 67 extending through a portion of the cover and the horizontal portion 63 of plate 12.

The bimetal element 16 has its components having different coefficients of expansion so arranged that upon a fall in temperature the legs of the U will tend to move apart, that is, to bow outwardly. Thus with the parts as shown in Figure 1, upon a fall in temperature the right leg of the element 16 will tend to bow or warp outwardly tending to move the bracket 22 away from the link 37. The bracket 22 is not immediately moved away from the link 37 upon a fall in temperature, however, because as it tends to do so this movement is counter-acted by the effect of the spring 19 moving the element 16 as a whole in a clockwise direction keeping the link 37 and the bracket 22 in contact with each other. In this manner, the element 16 is rotated bodily in a clockwise direction until the contacts carried by the brackets 27 and 28 are brought into engagement with the contact screws 52 and 53. The contact bracket or blade 28 is resilient (exerting less force resisting rotation than the spring 19 which provides the rotation) and engages the screw 53 before the bracket 27 engages the screw 52. Leftward movement of the brackets 27 and 28 is not prevented until the bracket 27 engages the screw 52. It will be understood that during the time that the element 16 is being rotated in a clockwise direction, the left leg of the bimetal element 16 is also tending to warp or bow outwardly, this movement also acting to move the brackets 27 and 28 towards the screws 52 and 53. When clockwise rotation of the element 16 about its pivot is no longer permitted by reason of the bracket 27 having engaged the screw 52, further outward bowing or warping of the right leg of element 16 overcomes the very slight force exerted by the spring 19, moves the brackets 22 and 23 away from the link 37 and towards the contact screws 47 and 48. At the same time, while bracket 27 is engaging with screw 52 and bowing or warping towards the screw 52, it will tend to rotate the element 16 bodily in the opposite direction, that is, in a counter-clockwise direction, which action will obviously additionally tend to move the right leg of element 16 and the brackets 22 and 23 towards their respective contact screws 47 and 48.

For day operation, the contacts associated with the left leg of the U are connected to the mechanism to be controlled and operation from these contacts will maintain the temperature for which the dial 56 is set. Thus after these contacts are closed to turn on the heating equipment for example, the temperature will begin to rise and there will be little or no tendency for the left leg of the element 16 to tend to rotate it in a counter-clockwise direction because while the temperature is rising the legs of the U tend to warp towards each other. However, when the contacts associated with the left leg of the U are disconnected, that is, when control is taken from them and the contacts associated with the right leg of the element 16 are put in control, the temperature will continue to fall after the contacts associated with the left leg make and the above described action will transpire wherein the tendency of the left leg of the U to bow outwardly will rotate the element 16 in a counterclockwise direction until the contacts associated with the right leg are made.

A thermostat constructed in accordance with Figures 1 and 2 could of course be used as a two stage thermostat with the contacts associated with each leg of the U shaped bimetal simultaneously controlling conditioning equipment.

To adjust the day temperature the dial 56 may be adjusted whereby the cam 35 rotates the lever 32 about its pivot thus adjusting the stop 37. Thus if the stop 37 is moved to the right, the element 16 is rotated in a counterclockwise direction about its pivot 17 and the left hand contact brackets 27 and 28 are moved away from their respective contact screws so that a lower temperature will be required for the element 16 to bring contacts 20 and 21 into engagement with their respective contact screws 52 and 53. On the other hand, if the stop 37 is moved to the left, the spring 19 will rotate the element 16 in a direction to bring the contact brackets 27 and 28 nearer to the screws 52 and 53 and a higher day temperature will be maintained. To adjust the night temperature the dial 57 may be adjusted so that the cam 43 moves the lever 39 about its pivot so as to adjust contact screws 47 and 48 toward or away from the contact brackets 22 and 23. Thus if the contact screws 47 and 48 are moved away from their respective contact brackets 22 and 23 a lower night temperature will be maintained and if the contact screws are moved toward the brackets a higher temperature will be maintained.

To prevent the possibility of setting the night temperature too high and the day temperature too low, thereby locking the contacts 24 and 25 in engagement with contacts 47 and 48, a bracket 49 is provided on the lever 32 and is adapted to engage the insulated piece 44 carried by the lever 39 to obviate such a condition.

From the foregoing, it is apparent that I have provided a novel day-night thermostat wherein a single bimetal element is shaped to take up the minimum of space, but the entire length of which is nevertheless effective to actuate both the day and night contacts. Adjustments of the day and night temperature may be individually and conveniently made and the arrangement of the adjusting dials is such as to present a neat and attractive appearance, and to afford the optimum in convenience of manipulation by an operator.

Figure 3:
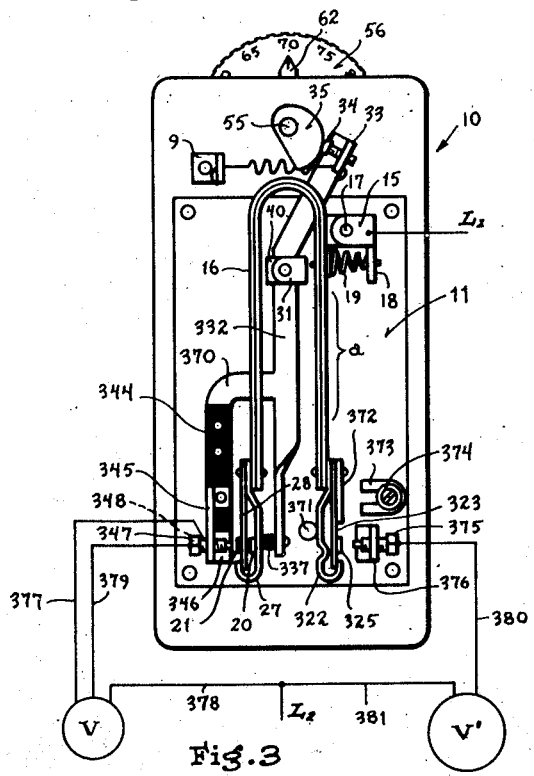
Figure 3 is a front view of a three-stage thermostat constituting another form of my invention, the wiring connections for valves controlled by the thermostat being diagrammatically shown.

In Figure 3 of the drawing I have represented a modified form of my invention wherein the thermostat has three stages, that is, it is effective to operate contacts sequentially at three different temperatures. Fundamentally, the modification of Figure 3 has the same general structural characteristics as the embodiment of Figures 1 and 2 and those elements of Figure 3 which are identical with corresponding elements of Figures 1 and 2 are numbered the same.

The lever 332 of Figure 3 corresponding to the lever 32 of Figure 1 has a stop 337 made of insulating material at its lower end against which the bracket 27 normally bears. The lever 332 has a branch arm 370 to which is suitably attached a strip of insulating material 344. The strip 344 carries contact brackets 345 and 346 which are similar to contact brackets 45 and 46 of Figure 1 and which carry contact screws 347 and 348, respectively.

At the lower end of the right leg of the element 16 in Figure 3 is carried a contact bracket 323 having a contact 325, the bracket being suitably attached to the element 16 by riveting or the like, there being a metal backing member 322 also attached to the right leg of element 16 and serving to limit the amount of leftward flexing of the contact carrying bracket 323. The backing member 322 normally bears against a stop 371 because of the force exerted by the compression spring 19. Also carried at the lower end of the right leg of element 16 is a small armature 372 which is arranged to cooperate with a permanent magnet 373 attached to the base panel 11 by means of an adjusting screw 374. The contact 325 cooperates with a contact screw 375 carried by a bracket 376.

The letter V indicates a valve which is controlled by one set of contacts of the thermostat and V' indicates a second valve of larger capacity. These valves may be arranged in parallel so as to control a flow of fuel to a burner of known type or they may control a flow of some type of heating medium and, as will be presently pointed out, these valves may be opened one at a time or they may both be opened at the same time. The letter $L_1$ indicates a line conductor and $L_2$ indicates a second line conductor.

The operation of the embodiment of Figure 3 is fundamentally similar to that of Figures 1 and 2, that is, with the parts in the position shown, upon a drop in temperature the contact brackets 27 and 28 will move toward their associated contact screws with the element 16 turning slightly in a clockwise direction about its pivot due to the right leg of element 16 tending to warp the backing member 322 away from the stop 371. Contact 21 will engage contact screw 348 first but upon such engagement no electrical circuits will be completed, but when contact 20 engages contact screw 347 a circuit will be completed energizing the valve V as follows: from line conductor $L_1$ through the thermostatic element, bracket 27, contact 20, contact screw 347, wire 379, the valve V, and wire 378 to the line conductor $L_2$. Completion of this circuit opens the valve V and upon opening of this valve a pair of switch contacts associated with the valve but not shown are closed, which connect wire 379 to a wire 377 so that upon this connection being made a maintaining circuit for the valve V is completed as follows: from the line conductor L₁ through the thermostatic element contact, bracket 28, contact 21, contact screw 348, wire 377, valve V, wire 378 to line conductor L₂. Thus the valve V will remain energized until contact 21 is disengaged from the contact screw 348 which will take place at a temperature one or two degrees higher than that at which contact 20 is disengaged from contact screw 347.

After the valve V has been opened to admit fuel, for example, at a certain low rate, heat will be transmitted to the spaces in which the thermostat is located. If the temperature does not now rise but continues to fall, the right leg of element 16 will continue to warp in a direction to move its lower end away from the stop 337, the element 16 now moving in a counter-clockwise direction about its pivot by reason of the fact that the contacts associated with its left leg are being urged more strongly against their respective contact screws. This action will now rotate element 16 in a counter-clockwise direction about its pivot 17 so as to also move contact 325 towards contact screw 375. After another predetermined drop in temperature of one or two degrees, the lower end of the right leg of element 16 will have moved away from stop 371 until the armature 372 is brought within the range of attraction of magnet 373. When this occurs, the magnet 373 will suddenly attract the armature 372 and will cause the entire element 16 and its associated contact brackets to be moved about its pivot in a counter-clockwise direction moving the contacts 20 and 21 away from their respective contact screws. This action will cause contact 325 to engage with contact screw 375 which will complete a circuit for energizing the valve V' which is of larger capacity than the valve V. This circuit is as follows: from line conductor L₁ to the thermostatic element 16, bracket 323, contact 325, contact screw 375, wire 380, valve V' and wire 381 to line conductor L₂. It will be understood of course that when valve V' is thus energized the valve V will be deenergized so that the resultant effect of the last described drop in temperature is to cause fuel to be supplied to the heating means at an appreciable greater rate. If this increased supply of fuel should be insufficient to cause the temperature around the thermostat to rise and the temperature continues to fall, the lower ends of the legs of the element 16 will continue to warp away from each other. That is, the left leg of the element will now again tend to move the contacts 20 and 21 towards their respective contact screws and the right leg of element 16 will warp in a direction to cause the backing member 322 to bear against bracket 323 whereby contact 325 will in turn bear against contact screw 375 so as to again rotate element 16 in a clockwise direction about its pivot, this action also tending to move contacts 20 and 21 towards their respective contact screws. After a further drop in temperature of one or two degrees, for example, the contacts 20 and 21 will engage their respective contact screws in the same manner as above described and the valve V will again be energized through the same circuit as already traced, and the maintaining circuit previously traced will again be completed. Both the valves V and V' will now be energized and their combined capacity will be sufficient to cause heating at a great enough rate so that the temperature around the thermostat will begin to rise. When the temperature begins to rise, the legs of the element 16 will tend to warp towards each other. The left and right legs will cooperate in warping in a direction which imparts a counterclockwise movement to the bimetal element 16 to disengage the contacts 20 and 21 associated therewith from their respective contact screws, while the position of the right leg remains substantially the same inasmuch as it is still held by the magnet 374. However, inasmuch as the lower end of the right leg of element 16 is unable to warp away from the magnet as yet, the portion (a) of the right leg will develop an internal tension tending to bow it outwardly after the left leg has angaged the stop 337. Also the similar portion of the left leg will tend to bow outwardly in a like manner and the U-shaped bent portion of the bimetal will have a tendency to spread the two legs. Therefore, it is seen that the entire length of the bimetal 16 is building up a stress tending to overcome the magnetic force exerted between the magnet 373 and the armature 372. While there may be no actual change in the shape of the bimetal element 16, the tension therein will tend to exert a force urging the element 16 in a clockwise direction about its pivot, this action further tending to move the contacts 20 and 21 away from their associated contact screws. After a predetermined rise in temperature, contacts 20 and 21 will be disengaged from their associated contact screws and the valve V will be deenergized. Upon a further rise in temperature, sufficient tension will have built up in the bimetal element 16 to break the armature 372 away from the magnet 373, whereupon the spring 19 will again be free to rotate the element 16 in a clockwise direction so as to move backing member 322 against stop 371 and to cause contacts 20 and 21 to again engage their respective contact screws. Thus, this last described action will cause V' to be deenergized and valve V to be reenergized. The valve V will not now be deenergized until there has been another predetermined rise in temperature at the end of which the parts will again be in the position shown in Figure 3.

From the foregoing description of the embodiment of Figure 3, it is to be seen that in this form of my invention I have provided a unique thermostat wherein there are three stages of operation utilizing two control devices of different capacity. As in the previously described embodiment the entire length of a single bimetal is effective to actuate both sets of contacts and the three stage effect is secured by the described action wherein the thermostatic element is bodily moved about its pivot first in one direction and then in the other, the permanent magnet co-operating to produce the movement of the element about its pivot for one of the stages.

Figure 4:
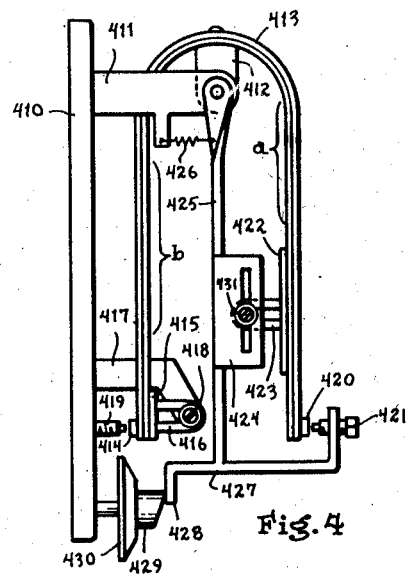
Figure 4 is a view of a thermostat constituting another form of my invention.

In Figure 4 I have shown a somewhat different form of my invention which I will now describe. In this figure, numeral 410 designates a base panel having a bracket 411 suitably secured thereto, the bracket 411 having a member 412 pivoted thereto. An inverted U shaped bimetallic element 413 has the mid portion of the U suitably attached to the member 412 by riveting or the like so that the element is bodily rotatable about the pivot point. At the lower end of the left leg of the element 413 is an electrical contact 414 and on the opposite side of this leg of the element 413 is carried an armature 415 which cooperates with a permanent magnet 416. The magnet 416 is attached to a bracket 417 extending from the base panel 410, by means of an adjusting screw 418. The contact 414 cooperates with a contact member 419 suitably secured to the base panel 410.

The right leg of the bimetal element 413 carries a contact 420 at its lower end which cooperates with a contact screw 421. Adjacent the lower end of the right leg of element 413 on the inside of the element is carried an armature 422 which cooperates with a permanent magnet 423. The magnet 423 is adjustably secured by means of a screw 431 to a slotted bracket 424 formed integrally with a lever arm 425 the upper end of which is pivoted to the bracket 411. A coil tension spring 426 normally biases the lever arm 425 in a clockwise direction about its pivot. At the lower end of the lever arm 425 is a horizontal angular bracket portion 427 which has an upstanding portion carrying the contact screw 421 and a downturned finger 428 which forms a cam follower for a cam 429 which is rotatable by a dial 430. By rotating the dial 430 the cam 429 acts on the cam follower 428 to move the lever arm to the left or right about its pivot. This action will be described in more detail presently.

In the embodiment of the invention of Figure 4, the bimetal element when subject to a falling temperature is normally under a certain amount of tension with the lower ends of the legs of the U tending to bow outwardly but being restrained by the magnets which hold their respective armatures in contact therewith. The bimetal element is so devised that upon a fall in temperature both legs of the U tend to warp in a direction to move the lower ends away from the permanent magnets.

In operation, upon a fall in temperature the lower end of the left leg of the element 413 will tend to warp away from the magnet 416 but inasmuch as it is restrained from doing so the portion indicated (b) will tend to bow inwardly. While there may be no actual change in the shape of the left leg of the U, its tendency to bow inwardly will exert a force tending to urge the entire element 413 in a counterclockwise direction about its pivot which action will be effective to assist in breaking contact 422 away from the magnet 423. At the same time, the tendency of the lower end of the right leg of the U to bow outwardly will be acting to break the armature 422 away from the magnet 423. At a predetermined temperature, armature 422 will be broken away and contact 420 will be snapped into engagement with contact screw 421. This action will relieve a certain amount of the tension in the element 413 but there will be no actual movement of the element bodily about the pivot by reason of the fact that the left leg is still restrained from movement by reason of armature 415 being retained by magnet 416. As the temperature continues to fall, the lower end of the left leg of element 413 will continue to try to break away from the magnet 416 and the lower end of the right leg of element 413 will bow in a direction to urge contact 420 more firmly into engagement with contact screw 421. Inasmuch as the lower end of the right leg is prevented from bowing or warping any further to the right, a tension will develop in portion (a) of the right leg tending to bow this portion of the leg inwardly. This tension will exert a force tending to urge the element bodily in a clockwise direction about its pivot and this action will assist in tending to break the left leg of the element away from the magnet 416. After another predetermined drop in temperature, the left leg of the element 413 will break the armature 415 away from the magnet 416 and the contact 414 will be snapped into engagement with the contact member 419. Thus it is to be seen that the present embodiment of the invention provides a two-stage thermostat, that is, one which is operable to actuate two pairs of contacts sequentially at different temperatures. As in the previous embodiments, the entire length of bimetal is effective to exert a force which force is utilized in its entirety for actuating each of the separate pairs of contacts.

Upon rise in temperature the contacts are opened in reverse order to that in which they were closed. That is, upon a rise in temperature contact 414 will be disengaged from contact member 419 first and armature 415 will be moved into engagement with magnet 416 with a snap action. Contact 420 will be disengaged from contact 421 at a slightly higher temperature and also with a snap action.

It will be understood that in the foregoing operation as shown on the drawing, the armature 422 is located at a shorter radius from the pivot point of the element 413 than is the armature 415. Obviously therefore the magnet 416 is effective to exert a greater force restraining the left leg of element 413 than the magnet 423 is operable to exert. Consequently, normally the armature 322 will be broken away first. The action can of course be varied by adjusting the magnet 423 toward or away from the pivot point of the element 413 or magnets of different sizes might be used.

It will also be understood that in overcoming the force exerted by the magnet 423 the length of bimetal effective in doing so will be that portion between the two magnets 416 and 423. However, the entire length of bimetal from the contact 420 to the magnet 416 will be effective to overcome the magnet 416. Because the force exerted by a bimetal element is proportional to its length, width, and thickness, a greater force will be available to overcome the magnet 416 which has a greater radius from the point about which the bimetal element 413 pivots. Hence it is seen that means are provided to compensate the bimetal element 413 for the stress released when the right leg of the element moves away from the magnet into engagement with the contact 421. In other words, the operating differential between the temperature at which the right leg of the bimetal 413 will be actuated, to the temperature at which the left leg will be actuated, may be reduced to a minimum by introducing a greater effective length of bimetal into operation between the stages. Therefore, the leverage exerted by the bimetal is modified and, when properly adjusted, will result in optimum sensitivity in the operation of the device.

For adjusting the operating temperatures of the present embodiment the dial 430 may be rotated in one direction or the other to move the lever arm 425 about its pivot.

By spreading the legs apart the instrument will control at a lower temperature and by converging the legs it will control at a higher temperature, inasmuch as the legs diverge upon a decrease in temperature. Thus if dial 430 is rotated in a direction to move lever arm 435 to the left, magnet 423 will draw armature 422 to the left which will increase the tension in the element 413. Whenever lever arm 425 is moved, contact screw 421 is of course simultaneously moved so that the spacing between contact 420 and contact screw 421 remains the same. When the tension in the element 413 is increased as described, that is, when the two legs are moved closer together, obviously not as low a temperature will be required to overcome the increased tension and cause the armatures to be broken away from their associated magnets. Upon moving the lever arm 425 to the right, the tension in the element 413 is decreased and in a manner opposite to that just described the operating temperatures of the contacts will be lowered. It will be seen from the foregoing that in this embodiment the entire length of bimetal is effective to actuate each of the pairs of contacts and that by reason of the arrangement wherein both legs of the element are restrained, snap action of both pairs of contacts is secured.

The three embodiments of my invention which I have disclosed are representative of its preferred forms and illustrative of its paramount novelty and attributes. It is intended that all of its novel features and aspects be covered in the appended claims and that the scope of the invention be limited by the claims rather than by my disclosure.

I claim as my invention:

1. In apparatus of the character described, in combination, a device comprising portions warpable in heating and cooling directions, said device being pivoted to permit rotation thereof, first stop means and second stop means associated with said device, said device upon warping of said portions in one direction cooperating with said first stop means to rotate it in one direction about its pivot until rotation in said direction is prevented by said second stop means to perform a first control function, and upon further warping of said portions in the same direction said device cooperates with said second stop means to rotate it in the other direction about its pivot to perform a second control function.

2. In apparatus of the character described, in combination, a device comprising portions warpable in heating and cooling directions, said device being pivoted to permit rotation thereof, first stop means and second stop means associated with said device, said device upon warping of said portions in one direction cooperating with said first stop means to rotate it in one direction about its pivot until rotation in said direction is prevented by said second stop means to perform a first control function, and upon further warping of said portions in the same direction said device cooperates with said second stop means to rotate it in the other direction about its pivot to perform a second control function, and third stop means limiting rotation of said device in said other direction.

3. In apparatus of the character described, in combination, a device comprising warpable portions, said device being pivoted to permit rotation thereof, first releasable means restraining one portion of said device spaced from said pivot, second releasable means restraining another portion of said device spaced from said pivot, said warpable portions developing a tension in response to temperature change tending to release both said releasable means, the tension in one portion of said device urging said device about its pivot in a direction to release the releasable means associated with the other portion.

4. In combination, a thermostatic device having warpable portions, said device being pivoted and having means biasing it about its pivot, means resisting rotation of the device about its pivot, one of said portions being warpable in a direction away from said resisting means so that said biasing means rotates the device towards the resisting means, means preventing continued rotation towards the resisting means, another of said portions being warpable toward said preventing means to rotate said device away from said preventing means, said one portion moving away from said resisting means to perform a control function, means to magnetically attract said one portion to move said device about its pivot in a direction to move said other portion away from said preventing means.

5. A double range thermostatic device comprising, a base having a pivot, an elongated bimetallic strip rotatably mounted at a point between its ends upon said pivot, first and second movable electrical contacts carried upon the ends of said strip, stationary contacts in cooperative relationship with said movable contacts, an abutting member, and means biasing said strip toward said member; said strip being adapted to rotate upon said pivot and act upon said abutting member to move said first movable contact to and from the cooperating stationary contact, and to act upon said first contact when in engagement with the stationary contact and rotate upon said pivot to move said second movable contact.

6. In combination, a pivot, an elongated thermostat rotatably mounted at a point intermediate its ends thereupon, control means associated with both ends of said thermostat, and stop means associated with one end of said thermostat, said thermostat being adapted to act upon said stop and rotate upon said pivot to actuate one of said control means associated with one end thereof, and to act upon said one control means and rotate upon said pivot to actuate the other of said control means.

7. In combination, a pair of control means, a thermally distortable actuator therefor mounted at an intermediate point upon a pivot, and a bearing point, said actuator being adapted to rotate upon said pivot and act upon said bearing point to actuate one of said control means, and to act upon said one control means and rotate upon said pivot to actuate the other of said control means.

8. In combination, a pair of control means, a thermally distortable elongated actuator therefor, a pivot for said actuator located between the ends thereof, and a bearing point spaced from said pivot, said actuator being adapted to act upon said bearing point and rotate upon said pivot to actuate one of said control means, and to move away from said bearing point to actuate the other of said control means.

9. In a control device, in combination, a pivot, an elongated thermal element pivoted thereupon at an intermediate point, control means associated with each end thereof, magnetic means also associated with said ends and spaced at different distances from said pivot, and stop means associated with said control means for performing a control function; said magnetic means, said stop means, and said pivot cooperating to provide sequential operation of said control means in a manner predetermined by the relative spacing of said magnetic means from said pivot.

10. A triple range thermostatic device comprising, a base having a pivot, an elongated bimetallic strip rotatably mounted at a point between its ends upon said pivot, first and second movable electrical contacts carried upon the ends of said strip, stationary contacts in cooperative relationship with said movable contacts, an abutting member, and means biasing said strip toward said member; said strip being adapted to rotate about said pivot and act upon said abutting member to move said first movable contact to and from the cooperating stationary contact, and to act upon said first contact when in engagement with the stationary contact and rotate about said pivot to move said second movable contact; magnetic means associated with said second movable contacts operable upon movement of said contacts theretoward to rotate said strip about said pivot to open said first contacts and close said second contacts, said strip being adapted to thereafter rotate about said pivot and act upon said second contacts to reclose said first contacts.

11. In combination, a pivot, an elongated thermostat rotatably mounted at a point intermediate its ends thereupon, control means associated with both ends of said thermostat, stop means associated with one end of said thermostat, said thermostat being adapted to act upon said stop and rotate upon said pivot to actuate one of said control means associated with one end thereof, and to act upon said one control means and rotate upon said pivot to actuate the other of said control means, first adjustment means for moving said stop means to vary one control setting for said thermostat, and second adjustment means for moving one of said control means to vary a second control setting for said thermostat.

12. In combination, a pivot, an elongated thermostat rotatably mounted at a point intermediate its ends thereupon, control means associated with both ends of said thermostat, stop means associated with one end of said thermostat, said thermostat being adapted to act upon said stop and rotate upon said pivot to actuate one of said control means associated with one end thereof, and to act upon said one control means and rotate upon said pivot to actuate the other of said control means, and adjustment means for varying the control point at which said control means will be actuated by said thermostat.

13. In combination, a pair of control means, a thermally distortable actuator therefor mounted at an intermediate point upon a pivot, a bearing point, said actuator being adapted to rotate upon said pivot and act upon said bearing point to actuate one of said control means, and to act upon said one control means and rotate upon said pivot to actuate the other of said control means, and adjustment means for varying the control point at which said control means will be actuated by said thermostat.

14. In a control device, in combination, a pivot, an elongated thermal element pivoted thereupon at an intermediate point, control means associated with each end thereof, magnetic means also associated with said ends and spaced at different distances from said pivot, stop means associated with said control means for performing a control function; said magnetic means, said stop means, and said pivot cooperating to provide sequential operation of said control means in a manner predetermined by the relative spacing of said magnetic means from said pivot, and adjustment means for varying the control point at which said control means will be actuated by said thermostat.

15. In combination, a base having a pivot, an elongated bimetallic thermostat mounted thereon, said thermostat being mounted at a point between its ends, first control means at one end of said thermostat and second control means at the other end thereof, a stop, means biasing one end of said thermostat into engagement with said stop, said thermostat being adapted to act upon said stop and rotate upon said pivot to actuate one of said control means associated with one end thereof, and to act upon said one control means and rotate upon said pivot to actuate the other of said control means, first adjustment means for moving said stop means to vary one control setting for said thermostat, and second adjustment means for moving one of said control means to vary a second control setting for said thermostat.

16. In combination, a base having a pivot, an elongated bimetallic thermostat mounted thereon, said thermostat being mounted at a point between its ends, first control means at one end of said thermostat and second control means at the other end thereof, magnetic means also associated with said ends and spaced at different distances from said pivot, said magnetic means exerting different rotative forces upon said thermostat because of said spacing to provide sequential operation for said control means, and means for adjusting the spacing of said magnetic means to vary the operation of said thermostat.

17. In combination, a pivot, an elongated switch actuator mounted at a point between its ends thereon, control means associated with the ends of said actuator and adapted to be operated in a two-stage manner upon movement of said actuator, and magnetic means also associated with said ends, said magnetic means being spaced at different distances from said pivot so as to exert different rotative forces upon said actuator to provide sequential operation of said control means.

18. In combination, a pivot, an elongated switch actuator mounted at a point between its ends thereon, control means associated with the ends of said actuator and adapted to be operated in a two-stage manner upon movement of said actuator, magnetic means also associated with said ends, said magnetic means being spaced at different distances from said pivot so as to exert different rotative forces upon said actuator to provide sequential operation of said control means, and means for adjusting the spacing of said magnetic means to vary the operation of said actuator.

19. In combination, a pivot, an elongated switch actuator mounted at a point between its ends thereon, control means associated with the ends of said actuator and adapted to be operated in a two-stage manner upon movement of said actuator, armature means also associated with said ends, and magnetic means cooperable with said armature means for actuating said control means, said magnetic means being spaced at different distances from said pivot so as to exert different rotative forces upon said actuator to provide sequential operation of said control means.

20. In combination, a pivot, an elongated switch actuator mounted at a point between its ends thereon, control means associated with the ends of said actuator and adapted to be operated in a two-stage manner upon movement of said actuator, armature means also associated with said ends, magnetic means cooperable with said armature means for actuating said control means, said magnetic means being spaced at different distances from said pivot so as to exert different rotative forces upon said actuator to provide sequential operation of said control means, and means for adjusting the spacing of said magnetic means to vary the operation of said actuator.

21. A triple range thermostatic device comprising, a base having a pivot, an elongated bimetallic strip rotatably mounted at a point between its ends upon said pivot, first and second movable control means at the ends of said strip, an abutting member, and means biasing said strip toward said member; said strip being adapted to rotate about said pivot and act upon said abutting member to move said first control means from a first to a second position, and to act upon said first control means and rotate about said pivot to move said second control means; magnetic means associated with said second control means operable to rotate said strip about said pivot to move said first control means from the second to the first position and move said second control means to a third position, said strip being adapted to thereafter rotate about said pivot and act upon said second control means to move said first control means to said second position.

GIFFORD I. HOLMES.